(12) United States Patent
Choi et al.

(10) Patent No.: US 8,736,693 B2
(45) Date of Patent: May 27, 2014

(54) DIGITAL PHOTOGRAPHING APPARATUS THAT CORRECTS HAND SHAKE, METHOD OF CONTROLLING THE SAME, AND RECORDING MEDIUM STORING THE METHOD

(75) Inventors: Myung-kyu Choi, Suwon-si (KR); Soon-geun Jang, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 421 days.

(21) Appl. No.: 12/939,396

(22) Filed: Nov. 4, 2010

(65) Prior Publication Data
US 2011/0122278 A1 May 26, 2011

(30) Foreign Application Priority Data
Nov. 26, 2009 (KR) .......................... 10-2009-0115192

(51) Int. Cl.
*H04N 5/228* (2006.01)
(52) U.S. Cl.
USPC ....................................................... 348/208.7
(58) Field of Classification Search
CPC .......................... H04N 5/2356; H04N 5/23254
USPC .............................. 348/208.4, 208.6, 208.12
See application file for complete search history.

(56) References Cited

U.S. PATENT DOCUMENTS

| | | | | |
|---|---|---|---|---|
| 4,853,733 | A * | 8/1989 | Watanabe et al. | 396/300 |
| 7,463,296 | B2 * | 12/2008 | Sun et al. | 348/254 |
| 2006/0132623 | A1 * | 6/2006 | Nozaki et al. | 348/231.99 |
| 2007/0212044 | A1 | 9/2007 | Yamasaki | |
| 2008/0151096 | A1 * | 6/2008 | Okada | 348/345 |
| 2008/0240607 | A1 | 10/2008 | Sun et al. | |
| 2009/0115860 | A1 | 5/2009 | Nakashima et al. | |
| 2010/0259626 | A1 * | 10/2010 | Savidge | 348/208.4 |

FOREIGN PATENT DOCUMENTS

| | | |
|---|---|---|
| CN | 101035206 A | 9/2007 |
| CN | 101356802 A | 1/2009 |
| KR | 1020050091787 A | 9/2005 |
| KR | 1020080037571 A | 4/2008 |

OTHER PUBLICATIONS

Office Action issued for CN 201010567019.6 (Feb. 21, 2014).

* cited by examiner

*Primary Examiner* — Gary C Vieaux
(74) *Attorney, Agent, or Firm* — Drinker Biddle & Reath LLP (57) ABSTRACT

A digital photographing apparatus may perform a method of correcting hand shake to obtain images of high quality, in which hand shake is corrected completely, by correcting the hand shake using a plurality of successive images having different exposure times, and in particular, by determining whether a short exposure image will be obtained from a time period in which hand shake is weak or in a time period in which hand shake is strong according to photographing conditions.

14 Claims, 7 Drawing Sheets

DIGITAL PHOTOGRAPHING APPARATUS THAT CORRECTS HAND SHAKE, METHOD OF CONTROLLING THE SAME, AND RECORDING MEDIUM STORING THE METHOD

CROSS-REFERENCE TO RELATED PATENT APPLICATION

This application claims the priority benefit of Korean Patent Application No. 10-2009-0115192, filed on Nov. 26, 2009, in the Korean Intellectual Property Office, the disclosure of which is incorporated herein in its entirety by reference.

BACKGROUND

1. Field of the Invention

Embodiments relate to a digital photographing apparatus that corrects hand shake, a method of controlling the digital photographing apparatus, and a recording medium having recorded thereon a program executable by a processor for performing the method.

2. Description of the Related Art

When a user takes an image by using a digital photographing apparatus, hand shake may occur. Recently, since digital photographing apparatuses have become light, it is likely to generate the hand shake severely, and users' demands for obtaining images of high quality have been increased. Therefore, various efforts to obtain images of high quality have been recently conducted by correcting the hand shake rapidly and completely without using an additional sensor in digital photographing apparatuses.

SUMMARY

A digital photographing apparatus corrects hand shake using a plurality of successive images having different exposure times from each other.

According to an embodiment, a method of controlling a digital photographing apparatus includes detecting a photographing condition; extracting hand shake information of a time period in which hand shake is weak and a time period in which hand shake is strong during a total exposure time, the extraction performed in correspondence with the detected photographing condition; obtaining a plurality of images having different exposure times during the total exposure time, the obtaining performed in correspondence with the photographing condition and the hand shake information such that an image having a short exposure time is obtained either in the time period in which hand shake is weak or in the time period in which hand shake is strong according to the photographing condition; extracting image information from the plurality of images; and generating a corrected image in which the hand shake is corrected.

The photographing condition may include at least one of grip posture, user information, photographing mode, and kind of the digital photographing apparatus.

The hand shake information corresponding to the photographing condition may be stored in the digital photographing apparatus in advance of photographing.

The plurality of images may include one or more images having a short exposure time and one or more images having a long exposure time.

The plurality of images having different exposure times may be a plurality of images taken with a shutter speed different from each other.

When the photographing condition includes at least one of grip posture, user information, photographing mode, or a kind of digital photographing apparatus that is significantly affected by hand shake, the image having the short exposure time may be obtained in the time period in which hand shake is weak.

When the photographing condition includes at least one of grip posture, user information, photographing mode, or a kind of digital photographing apparatus that is not significantly affected by hand shake, the image having the short exposure time may be obtained in the time period in which hand shake is strong.

The generating of the corrected image may include: extracting first image information from the image having the short exposure time and second image information from the image having the long exposure time; and generating the corrected image in which the hand shake is corrected by using the first and second image information.

According to another embodiment, a non-transitory computer readable storage medium may have stored thereon a computer program executable by a processor for performing the method of controlling the digital photographing apparatus.

According to another embodiment, a digital photographing apparatus includes: a photographing condition detector that detects photographing conditions; a hand shake information derive unit that extracts hand shake information of a time period in which hand shake is weak and a time period in which hand shake is strong during a total exposure time, the extraction performed in correspondence with the detected photographing condition; a photographing controller that controls the digital photographing apparatus to obtain a plurality of images having different exposure times during the total exposure time, the obtaining performed in correspondence with the photographing condition and the hand shake information such that an image having a short exposure time is obtained either in the time period in which hand shake is weak or in the time period in which hand shake is strong according to the photographing condition; and an image corrector that extracts image information from the plurality of images and generates a corrected image in which the hand shake is corrected.

The photographing condition may include at least one of grip posture, user information, photographing mode, and kind of the digital photographing apparatus.

The digital photographing apparatus may further include a hand shake information database (DB) that stores hand shake information corresponding to the photographing condition.

The photographing controller may control the digital photographing apparatus to obtain one or more images having short exposure time and one or more images having a long exposure time.

The photographing controller may control a shutter speed to obtain the plurality of images having different exposure times from each other.

When the photographing condition includes at least one of grip posture, user information, photographing mode, or a kind of digital photographing apparatus that is significantly affected by hand shake, the photographing controller may control the digital photographing apparatus to obtain the image having the short exposure time in the time period in which hand shake is weak.

When the photographing condition includes at least one of grip posture, user information, photographing mode, or a kind of digital photographing apparatus that is not significantly affected by hand shake, the photographing controller may control the digital photographing apparatus to obtain the image having the short exposure time in the time period in which hand shake is strong.

The image corrector may include: an image information extractor that extracts first image information from the image having the short exposure time and second image information from the image having the long exposure time; and a corrected image derive unit that generates a corrected image in which the hand shake is corrected by using the first image information and the second image information.

BRIEF DESCRIPTION OF THE DRAWINGS

The above and other features and advantages will become more apparent by describing in detail exemplary embodiments with reference to the attached drawings in which.

DETAILED DESCRIPTION

Hereinafter, exemplary embodiments will be described more fully with reference to the accompanying drawings. The invention may, however, be embodied in many different forms and should not be construed as limited to the exemplary embodiments set forth herein.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

The terminology used herein is for the purpose of describing particular embodiments only and is not intended to be limiting of the invention. As used herein, the singular forms are intended to include the plural forms as well, unless the context clearly indicates otherwise. It will be further understood that the terms "include," "includes," "including," "has," "have," "having," "comprises" and/or "comprising," or other forms thereof, when used in this specification, specify the presence of stated features, integers, steps, operations, elements, and/or components, but do not preclude the presence or addition of one or more other features, integers, steps, operations, elements, components, and/or groups thereof.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more central processing unit (CPU) or other control devices. Similarly, where the elements of the invention are implemented using software programming or software elements, the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

Hereinafter, embodiments will be described in detail with reference to the attached drawings. Like reference numerals in the drawings denote like elements.

Figure 1:
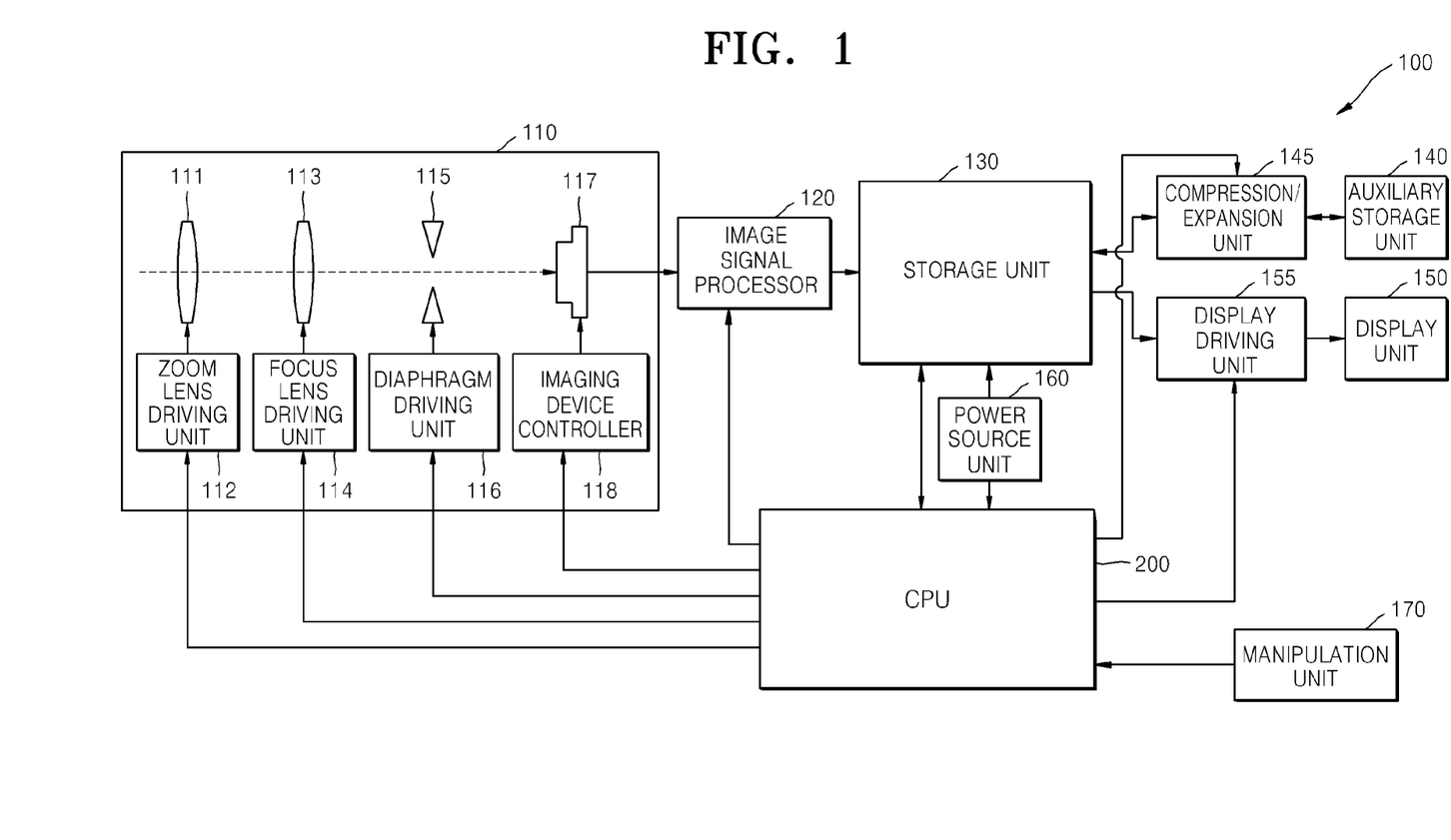
FIG. 1 is a block diagram of a digital photographing apparatus, according to an embodiment.

FIG. 1 is a block diagram of a digital photographing apparatus 100, according to an embodiment.

The invention is not limited to the digital photographing apparatus 100 of FIG. 1, and may be applied to other devices, such as a digital still camera (DSC), a digital single-lens reflex camera (DSLR), a mobile phone adopting a video camera or photographing function, an MPEG audio player-3 (MP3), a personal digital assistant (PDA), and a personal multimedia player (PMP). Embodiments that will be described later may also be applied to the above devices.

In processes of photographing a subject, light from the subject transmits through a zoom lens 111 and a focusing lens 113 that form an optical system of an imaging unit 110, and an intensity of the light is adjusted according to an opening degree of a diaphragm 115. After that, an image of the subject is focused on a light receiving surface of an imaging device 117. The image focused on the light receiving surface of the imaging device 117 is converted into an electric image signal by a photoelectric conversion.

The imaging device 117 may be a charge coupled device (CCD) or a complementary metal oxide semiconductor image sensor (CIS). The diaphragm 115 is opened in an auto-focusing algorithm that is executed on receiving a first release signal, that is, a half-pressed state of a release button, and then, executes an exposure process on receiving a second release signal that is generated when the release button is fully-pressed.

The zoom lens 111 and the focusing lens 113 are respectively controlled by a zoom lens driving unit 112 and a focusing lens driving unit 114. For example, when a wide angle-zoom signal is generated, a focal length of the zoom lens 111 is reduced to increase a viewing angle, and when a telephoto-zoom signal is generated, the focal length of the zoom lens 111 is increased to reduce the viewing angle. Since a location of the focusing lens 113 is controlled in a state where the location of the zoom lens 111 is set, the viewing angle is rarely affected by the location of the focusing lens 113. A diaphragm driving unit 116 controls an opening degree of the diaphragm 115. A sensitivity of the imaging device 117 is controlled by an imaging device controller 118.

The zoom lens driving unit 112, the focusing lens driving unit 114, the diaphragm driving unit 116, and the imaging device controller 118 control corresponding components according to results calculated by a central processing unit (CPU) 200 based on exposure information and focusing information. According to the embodiment, the CPU 200 controls the imaging unit 110 to obtain a plurality of images taken with different shutter speeds from each other during a total exposure time.

The electric image signal is output from the imaging device 117 to an image signal processor 120. The image signal processor 120 converts the image signal input from the imaging device 117 into a digital signal when the image signal is an analog signal, and various image treatments are performed with respect to the digital signal. Then, the digital image signal is temporarily stored in a storage unit 130.

In more detail, the image signal processor 120 performs signal processes such as auto white balance, auto exposure, or gamma correction for improving image quality, and outputs the digital image signal of improved image quality. In addition, the image signal processor 120 performs image processes such as color filter array interpolation, color matrix, color correction, and color enhancement.

The storage unit 130 may include a program storage unit that stores programs relating to operations of the digital photographing apparatus 100 regardless of whether electric power is supplied to the storage unit 130, and a main storage unit that temporarily stores the image data and other data while electric power is supplied to the storage unit 130.

The program storage unit stores an operating program for operating the digital photographing apparatus 100 and various application programs. In addition, the CPU 200 controls the components according to the programs stored in the program storage unit.

The main storage unit temporarily stores the image signal output from the image signal processor 120 or an auxiliary storage unit 140.

The main storage unit may be directly connected to a power source unit 160 separately from power supplied to operate the digital photographing apparatus 100. Therefore, codes stored in the program storage unit in advance may be copied to the main storage unit and may be changed to executable codes so as to increase booting speed of the digital photographing apparatus 100, and the data stored in the main storage unit may be read rapidly when the digital photographing apparatus 100 is re-booted.

The digital image signal stored in the main storage unit is output to a display driving unit 155, and then, is converted into an analog signal and at the same time, converted into an image signal that is optimal to be displayed. In addition, the converted image signal is displayed as a predetermined image on a display unit 150. The display unit 150 performs as a view finder that successively displays image signals obtained by the imaging device 117 in order to determine a photographing range during the photographing mode. Various display devices such as a touch screen, a liquid crystal display (LCD), an organic light emitting diode (OLED) display, and an electrodeposition display (EDD) may be used as the display unit 150.

Processes of recording the image signal will be described as follows. The image signal is temporarily stored in the storage unit 130, and at this time, information about the image signal, as well as the image signal, is stored in the auxiliary storage unit 140. To store the image signal in the auxiliary storage unit 140, the image signal to be stored and information about the image signal are output to a compression/expansion unit 145. The compression/expansion unit 145 performs compression of the image signal to be stored, that is, performs an encoding process in a format such as joint photographic experts group (JPEG), by a compression circuit to generate an image file, and the image file is stored in the auxiliary storage unit 140.

A semiconductor memory such as a fixed type semiconductor memory, for example, a flash memory, or a card type flash memory formed as a card or a stick that is detachable from the apparatus, or a magnetic storage medium such as a hard disk or a floppy disk, may be used as the auxiliary storage unit 140.

To view a stored image in an image file, the image file that is compressed and stored in the auxiliary storage unit 140 is output to the compression/expansion unit 145, and then, expanded by an expansion circuit, that is, decoded, to extract the image signals from the image file. In addition, the extracted image signal is output to the storage unit 130. The image signal is stored temporarily in the storage unit 130, and then, reproduced as a predetermined image on the display unit 150 by the display driving unit 155.

In addition, the digital photographing apparatus 100 includes a manipulation unit 170 that receives input signals from a user. The manipulation unit 170 may include a shutter release button that is pressed in order to open and close a shutter to expose the imaging device 117 to light from the subject for a predetermined time period, a power button to control supplying electric power to the digital photographing apparatus 100, a wide angle-zoom button and a telephoto-zoom button for increasing or reducing a viewing angle according to the input, and various functional buttons such as a mode selection button for selecting a letter input mode, a photographing mode, or a reproducing mode, a button for white balance setting, and a button for exposure setting. The manipulation unit 170 may be realized by an icon on the touch screen.

The CPU 200 performs calculations according to the operating system and application programs stored in the storage unit 130, temporarily stores the calculation results, and controls the corresponding components according to the calculation results so that the digital photographing apparatus 100 operates. According to the present embodiment, the CPU 200 determines photographing conditions, and extracts hand shake information corresponding to the photographing conditions. In addition, the CPU 200 controls the imaging unit 110 so as to obtain a plurality of images having different exposure times from each other corresponding to the photographing conditions, and then, execute the hand shake correction by using the plurality of images.

Figure 2:
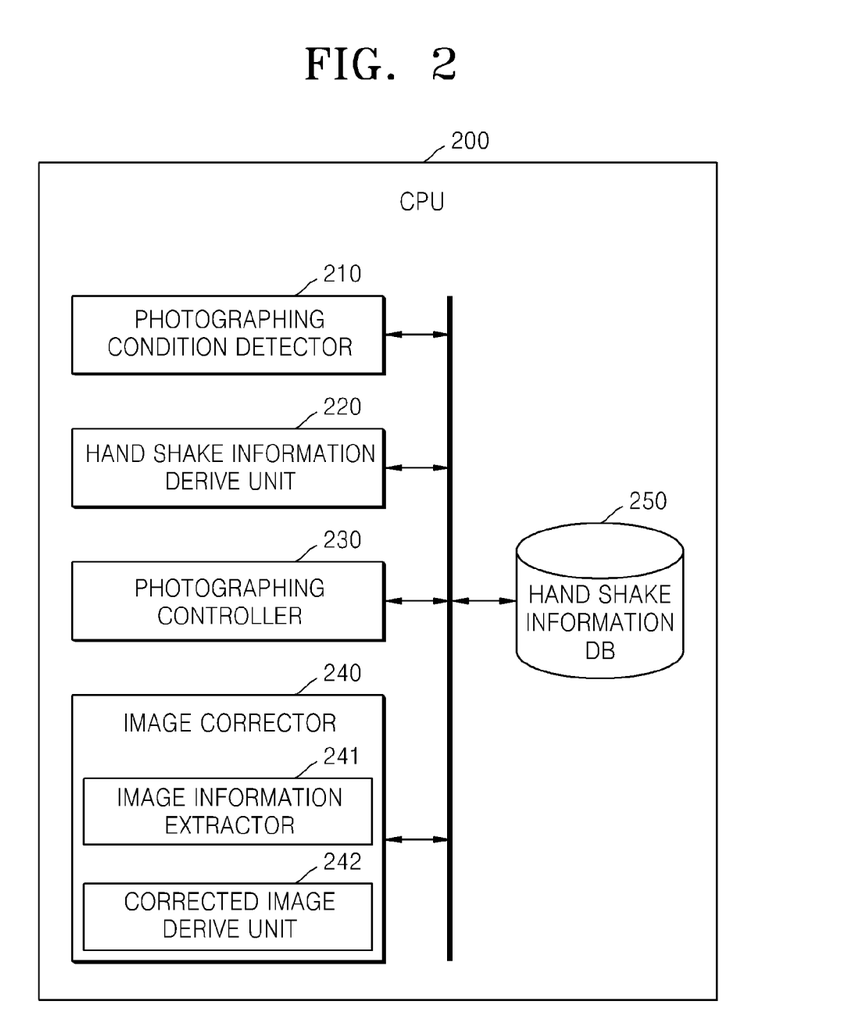
FIG. 2 is a block diagram of a central processing unit (CPU) in the digital photographing apparatus of FIG. 1, according to an embodiment.

FIG. 2 is a block diagram of the CPU 200 in the digital photographing apparatus 100 of FIG. 1, according to an embodiment.

Referring to FIG. 2, the CPU 200 of the present embodiment includes a photographing condition detector 210, a hand shake information derive unit 220, a photographing controller 230, and an image corrector 240.

The photographing condition detector 210 detects photographing conditions such as grip posture, user information, photographing mode, or kind of the digital photographing apparatus 100. In particular, the photographing condition detector 210 may detect a first photographing condition and a second photographing condition separately. The first photographing condition refers to the condition in which a probability of being affected by hand shake is high when the image is taken. A photographed image may be considered to be significantly affected by hand shake when the effects of hand shake on the image are apparent to a viewer of the image after the image is taken, such as when viewing the image on the digital photographing apparatus or another digital image processing apparatus, or when viewing a photographic print made from the image. For example, when the digital photographing apparatus 100 is gripped by one hand, when kids or elderly people use the photographing apparatus 100, when the photographing mode is night view or inside, where light intensity cannot be ensured sufficiently, or when the digital photographing apparatus 100, such as a digital still camera (DSC), does not support a high sensitivity international standards organization (ISO) mode, the photographing condition is determined as the first photographing condition. The second photographing condition refers to the condition in which the probability of being affected by hand shake is low when the image is taken. For example, when a tripod is used to take an image, when an expert photographer uses the digital photographing apparatus 100, when the photographing mode is a backlight mode having a wide dynamic range or a flash mode, where a sufficient light intensity is ensured, or when the digital photographing apparatus 100, such as a digital single lens reflex (DSLR) camera, supports a high sensitivity ISO mode, the photographing condition is determined as the second photographing condition.

The hand shake information derive unit 220 extracts hand shake information corresponding to the photographing condition sensed by the photographing condition detector 210. The hand shake information may be regarding an intensity of the hand shake per unit time period, that is, information regarding a time period in which the hand shake is weak and a time period in which the hand shake is intense during a total exposure time. The hand shake information derive unit 220 identifies a hand shake pattern during the total exposure time when the photographing is performed under the detected photographing condition.

Figure 3:
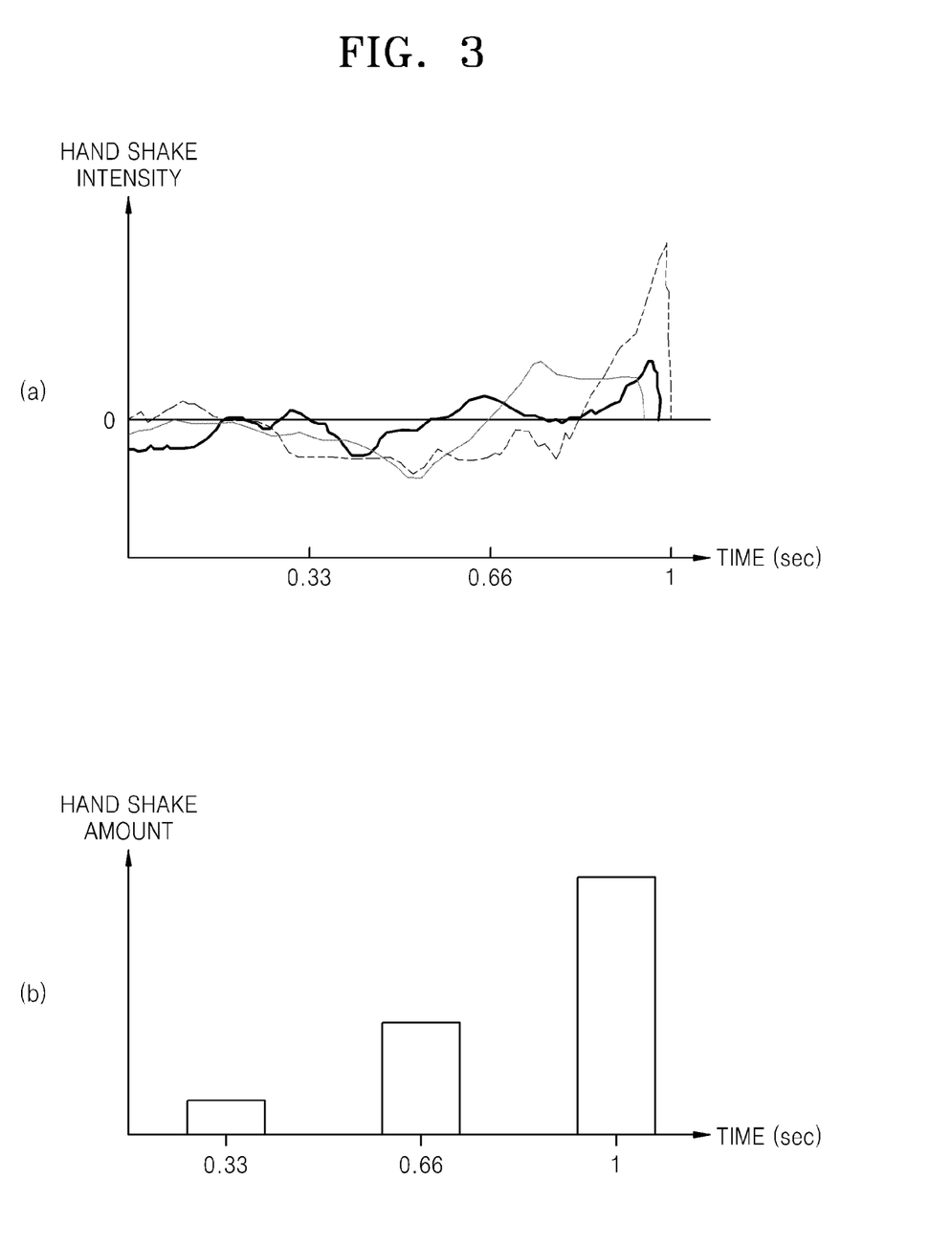
FIG. 3 shows exemplary graphs of hand shake information with respect to the photographing condition in a general digital photographing apparatus.

FIG. 3 shows exemplary graphs of hand shake information with respect to the photographing condition in a general digital photographing apparatus.

Figure 4:
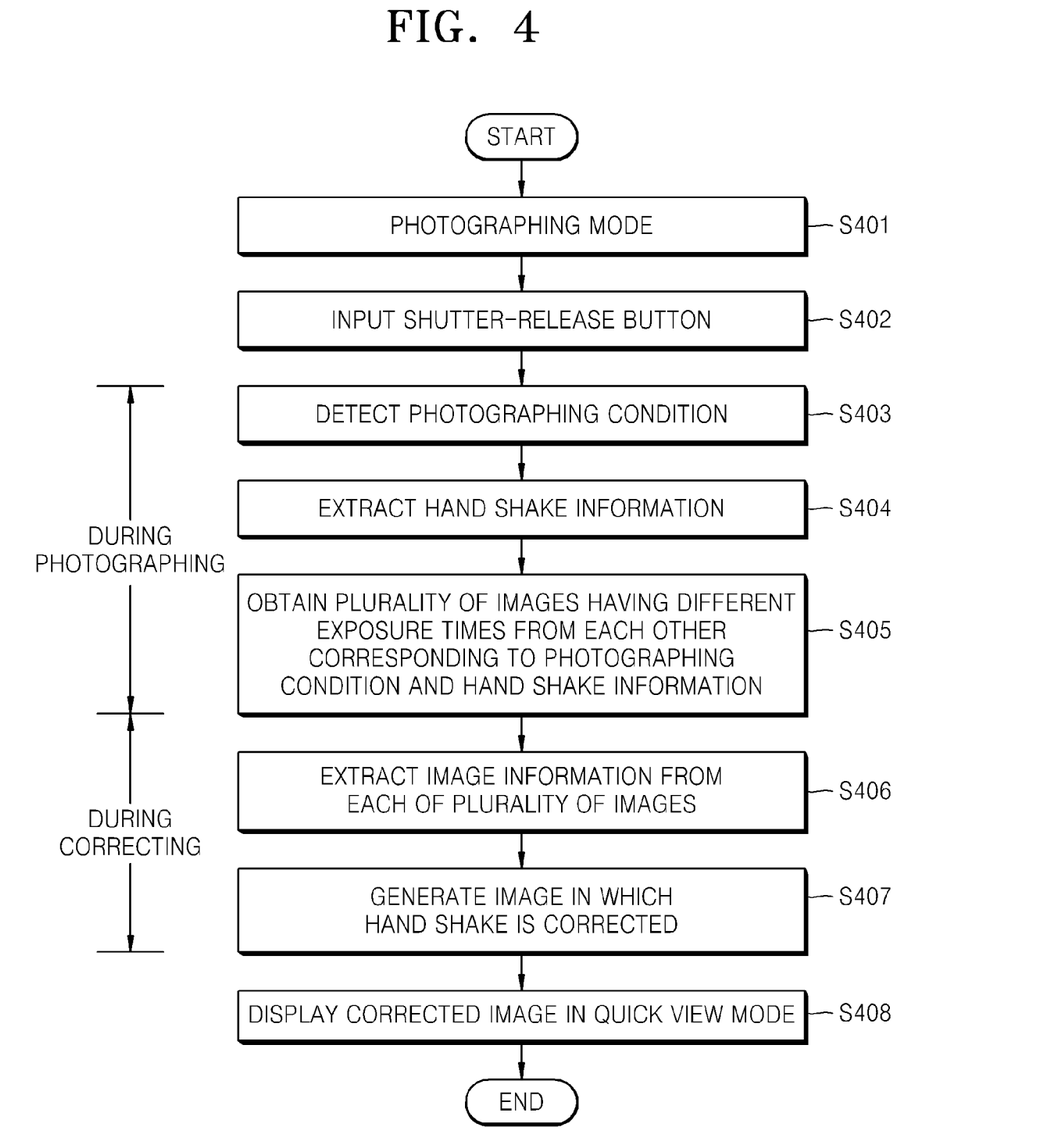
FIG. 4 is a flowchart illustrating a method of correcting hand shake in a digital photographing apparatus, according to an embodiment.
Figure 5:
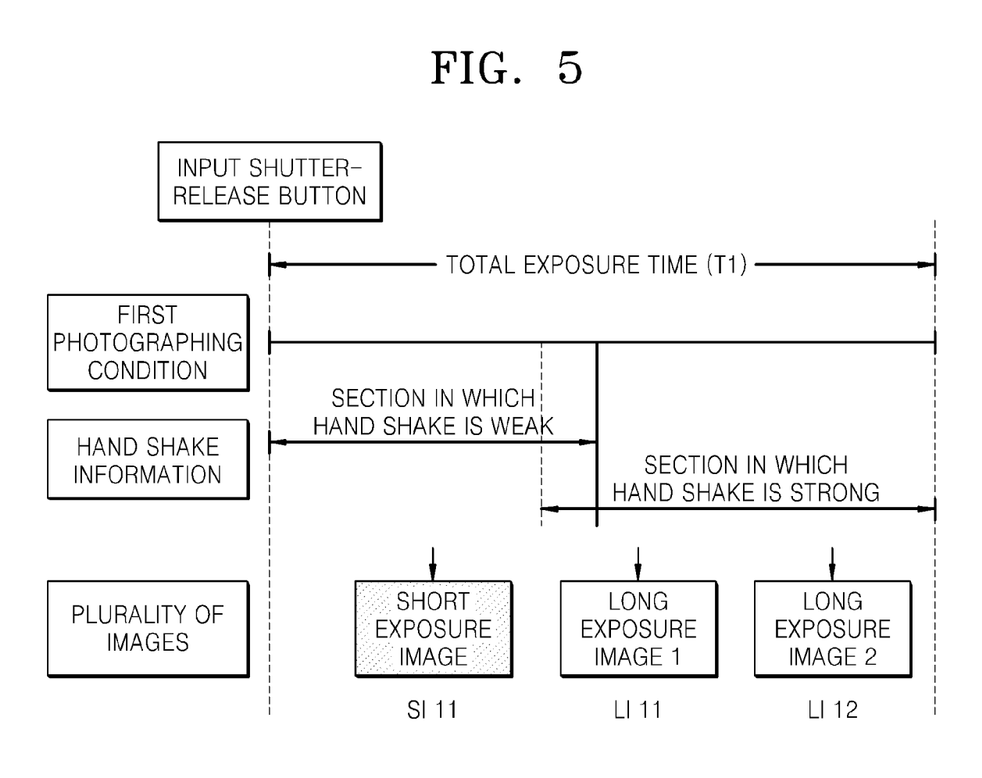
FIGS. 5 and 6 illustrate operations of obtaining a plurality of images having different exposure times from each other during total exposure time, according to the photographing conditions, according to an embodiment.
Figure 6:
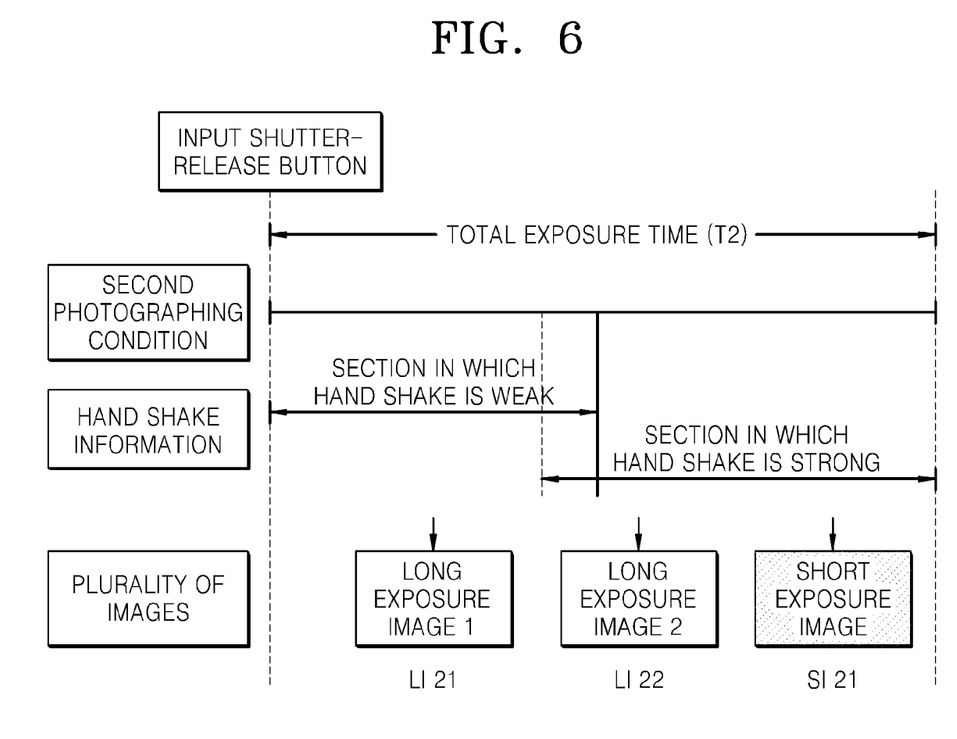

Referring to FIG. 3, when photographing is performed using an exposure time of 1 second in a general digital photographing apparatus, the hand shake pattern is shown as graph (a) of FIG. 3. As the photographing is repeatedly tried, the hand shake is the weakest in the initial 0.33 second period of the total exposure time of 1 second, and is the strongest in the last 0.33 second period, when the total exposure time of 1 second is analyzed in units of 0.33 second as shown in graph (b) of FIG. 3. Therefore, the hand shake of the front section of the total exposure time is considered weak and the hand shake of the last section of the total exposure time is considered strong in the general digital photographing apparatus. FIGS. 4 through 6 will be described based on the information obtained from the graphs of FIG. 3.

Referring again to FIG. 2, the hand shake information derive unit 220 may extract the hand shake information from a hand shake information database (DB) 250. The hand shake information DB 250 stores hand shake information corresponding to the photographing condition. The hand shake information DB 250 stores the hand shake information matched to each of the photographing conditions. The hand shake information DB 250 may be prepared by a manufacturer of the digital photographing apparatus 100 when the digital photographing apparatus 100 is manufactured, or may be stored by the user through an update operation. The hand shake information DB 250 may be generated by various ways. For example, images of point light source arrangements may be taken with time intervals of t seconds in response to the photographing information such as the photographing mode and the user information. Then, each of the obtained images are partitioned to analyze the arrangement of the point light sources, and the hand shake information may be derived from information about time versus brightness that is obtained from the analyzing result. However, the method of generating the hand shake information corresponding to the photographing condition is not limited thereto, and various known methods may be used to generate the hand shake information.

The photographing controller 230 controls the imaging unit 110 so as to obtain a plurality of images having different exposure times from each other during the total exposure time based on the photographing condition detected by the photographing condition detector 210 and the hand shake information derived by the hand shake information derive unit 220. According to the present embodiment, the photographing controller 230 controls the photographing unit 110 so as to take one or more images having a short exposure time (hereinafter, short exposure images) and one or more images having a long exposure time (hereinafter, long exposure images) during the total exposure time. In particular, the photographing controller 230 obtains the short exposure images in a time period in which the hand shake is weak or in a time period in which the hand shake is strong corresponding to the photographing condition. Detailed operations of the photographing controller 230 will be described with reference to FIGS. 5 and 6 below.

The image corrector 240 extracts image information from each of the plurality of images obtained under the control of the photographing controller 230 to generate an image of high quality, the hand shake of which is corrected.

The image corrector 240 includes an image information extractor 241 that extracts first image information from the short exposure images and second image information from the long exposure images, and a corrected image derive unit 242 that generates a final image, in which the hand shake is corrected, by using the first and second image information.

For example, the image information extractor 241 extracts boundary information from the short exposure images and noise information from the long exposure images. However, the extracted image information is not limited thereto, and brightness information may be used. The corrected image derive unit 242 generates a corrected image as the final image, in which the hand shake is corrected, by using a hand shake correction algorithm that uses the image information. For example, the corrected image derive unit 242 filters noise by using the noise information and calculates focus value by using the boundary information. Thus, the corrected image from which the noise is removed and having the largest focus value is derived, and the corrected image is a clear image in which the hand shake is corrected. However, the method of deriving the corrected image is not limited to the above example.

FIG. 4 is a flowchart illustrating a method of correcting hand shake in the digital photographing apparatus 100, according to an embodiment.

Referring to FIG. 4, in a photographing mode (S401), the user presses a shutter-release button (S402). According to another embodiment, the user may press the shutter-release button after entering a hand-shake correction menu in a photographing mode.

In operation S403, the photographing condition detector 210 detects the photographing condition. As described above, the photographing condition may include the grip posture, the user information, the photographing mode, and the kind of the digital photographing apparatus 100. Hereinafter, in FIGS. 4 through 6, the photographing condition will be classified as a first photographing condition, in which the probability of obtaining images affected by hand shake is high, and a second photographing condition, in which the probability of obtaining images affected by hand shake is low.

In operation S404, the hand shake information derive unit 220 extracts the hand shake information corresponding to each of the photographing conditions from the hand shake information DB 250. Hereinafter, for the sake of convenience, it is assumed that the first photographing condition and the second photographing condition each include a section (e.g., time period) in which the hand shake is weak and a section in which the hand shake is strong, and the section in which the hand shake is weak is prior to the section in which the hand shake is strong. However, the hand shake information according to the photographing condition is not limited to the above example, and a plurality of sections in which the hand shake is weak and a plurality of sections in which the hand shake is strong may exist, and the order of the sections may vary.

In operation S405, the photographing controller 230 controls each of the components and obtains a plurality of images having different exposure times corresponding to the photographing condition and the hand shake information. In more detail, in operation S405, when the photographing condition is the first photographing condition, the photographing controller 230 obtains the short exposure image in the section in which the hand shake is weak, and when the photographing condition is the second photographing condition, the photographing controller 230 obtains the short exposure image in the section in which the hand shake is strong. Operation S405 will be described with reference to FIGS. 5 and 6 in more detail.

FIGS. 5 and 6 illustrate operations of obtaining the plurality of images having different exposure times from each other during the total exposure time, according to the photographing conditions, according to an embodiment. For the sake of convenience, the description refers to an embodiment in which a single short exposure image and a plurality of long exposure images are obtained. In addition, the section in which the hand shake is weak is arranged on a front portion of the processes, with reference to the experimental results of FIG. 3.

Referring to FIG. 5, in a first photographing condition, the photographing controller 230 obtains a short exposure image SI11 and a plurality of long exposure images LI11 and LI12. Here, since the photographing condition is the first photographing condition, the short exposure image SI11 is obtained in the section in which the hand shake is weak. For example, in the first photographing condition when the photographing is performed in a low luminance by using a digital still camera (DSC), the short exposure image SI11 is obtained in the section in which the hand shake is weak, and then an image correction is performed. This is because when the photographing condition is affected by hand shake, a probability of obtaining a corrected image in which the hand shake is corrected completely is increased when the short exposure image has less hand shake. In addition, in the first photographing condition, a possibility that the exposure time for obtaining the long exposure image is equal to or less than a length of the section in which the hand shake is weak is much lower than a possibility that the exposure time for obtaining the short exposure image is equal to or less than the length of the section in which the hand shake is weak. Thus, it is difficult to arrange the long exposure image in the section in which the hand shake is weak in the first photographing condition.

Referring to FIG. 6, in a second photographing condition, the photographing controller 230 obtains a short exposure image SI21 and a plurality of long exposure images LI21 and LI22. Here, since the photographing condition is the second photographing condition, the short exposure image SI21 is obtained in the section in which the hand shake is strong. For example, in the second photographing condition when the photographing mode is less affected by hand shake because the light intensity is ensured sufficiently, as in the backlight mode in the DSC or when the DSLR camera that supports the high sensitivity ISO is used, the short exposure image SI21 is obtained in the section in which the hand shake is strong, and then the image correction is performed. This is because the short exposure image SI21 is less affected by hand shake than the long exposure images LI21 and LI22 since the exposure time of the short exposure image SI21 is shorter than the exposure time of the long exposure images LI21 and LI22. Therefore, when the long exposure images LI21 and LI22 are obtained in the section in which the hand shake is weak, stabilized long exposure images and image information may be obtained. Accordingly, image information of a high image quality may be obtained.

That is, since the corrected final image uses the image information from the short exposure image and the long exposure images, as the hand shake is reduced in all image information, the final image in which the hand shake is corrected completely may be obtained. Therefore, the short exposure image may be appropriately obtained in the section in which the hand shake is weak or the hand shake is strong in order to obtain the final image that is less affected by the hand shake.

Referring again to FIG. 4, in operation S406, image information is extracted from each of the plurality of images. For example, boundary information may be extracted from the short exposure image, and noise information may be extracted from the long exposure images. Next, the corrected image in which the hand shake is corrected is generated by combining the image information in operation S407. The corrected image is displayed in a quick view mode in operation S408, and then the corrected image may be identified again in a reproduction mode after being stored.

Figure 7:
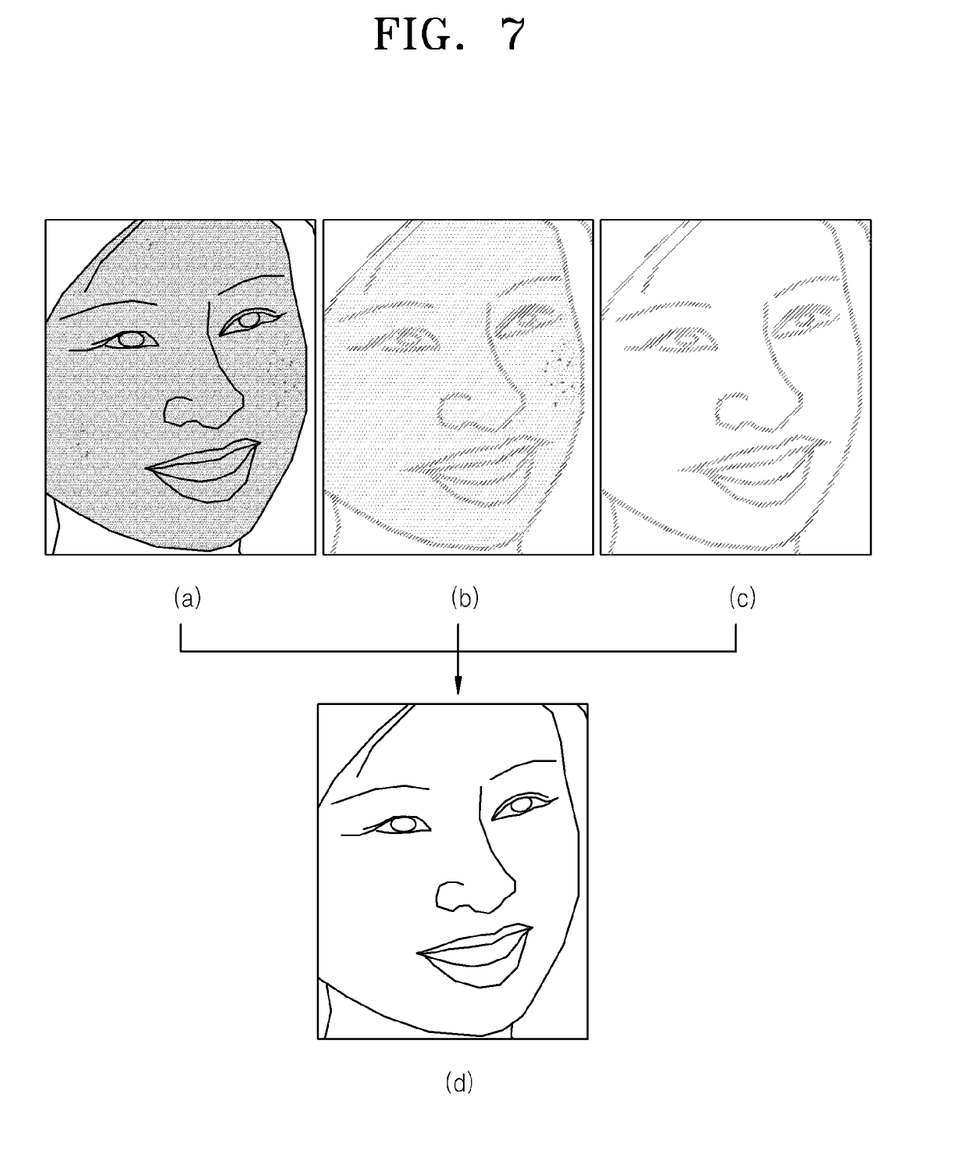
FIG. 7 is a diagram showing a result image corrected by the method of correcting hand shake, according to the embodiment.

FIG. 7 is a diagram showing a result image corrected by a method of correcting hand shake, according to an embodiment.

Referring to FIG. 7, in a short exposure image (a), a boundary of a subject is clear; however, there is a lot of noise. On the other hand, in long exposure images (b) and (c), there is less noise than in the short exposure image (a); however, the boundary is not clear and blurring occurs. Therefore, image information is extracted from each of the images (a), (b), and (c), and a final image (d), in which the hand shake is corrected, may be obtained.

According to the embodiment, the short exposure image may be obtained in the optimal hand shake section according to the photographing condition, and thus, the image of high quality may be obtained.

In addition, the hand shake information according to the photographing condition is stored in the digital photographing apparatus in advance, and thus, a sensor that senses the hand shake is not necessary.

The apparatus described herein may comprise a processor, a memory for storing program data to be executed by the processor, a permanent storage such as a disk drive, a communications port for handling communications with external devices, and user interface devices, including a display, keys, etc. When software modules are involved, these software modules may be stored as program instructions or computer readable code executable by the processor on a non-transitory computer-readable media such as read-only memory (ROM), random-access memory (RAM), CD-ROMs, magnetic tapes, floppy disks, and optical data storage devices. The computer readable recording media may also be distributed over network coupled computer systems so that the computer readable code is stored and executed in a distributed fashion. This media can be read by the computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention.

What is claimed is:

1. A method of controlling a digital photographing apparatus, the method comprising:
   detecting a photographing condition;
   based on the detected photographing condition,
      extracting hand shake information of a first time period of a plurality of time periods of a total exposure time;
      extracting hand shake information of a second time period of the plurality of time periods;
   wherein the hand shake intensity per unit of time of the first time period is less than that of the rest of the plurality of time periods;
   wherein the hand shake intensity per unit of time of the second time period is greater than that of the rest of the plurality of time periods;
   obtaining a plurality of images having different exposure times during the total exposure time based on the photographing condition and the hand shake information, wherein the plurality of images includes a first image and a second image, the first image having an exposure time that is less than that of the second image, wherein the obtaining comprises:
      obtaining the first image in the first time period according to the photographing condition,
      obtaining the second image in the second time period according to the photographing condition; and
   generating a corrected image in which the hand shake is corrected based on image information of the first image and image information of the second image.

2. The method of claim 1, wherein the photographing condition comprises at least one of grip posture, user information, photographing mode, and type of the digital photographing apparatus.

3. The method of claim 1, wherein the extracted hand shake information corresponds to the photographing condition and is stored in the digital photographing apparatus in advance of photographing.

4. The method of claim 1, wherein the plurality of images having different exposure times is a plurality of images taken with a shutter speed different from each other.

5. The method of claim 1,
   extracting the image information of the first image and the image information of the second image
   wherein the image information of the first image is boundary information, and the image information of the second image is noise information.

6. A non-transitory computer readable storage medium having stored thereon a program executable by a processor for performing a method of correcting hand shake, the method comprising:
   detecting a photographing condition;
   based on the detected photographing condition,
      extracting hand shake information of a first time period of a plurality of time periods of a total exposure time;
      extracting hand shake information of a second time period of the plurality of time periods;
   wherein the hand shake intensity per unit of time of the first time period is less than that of the rest of the plurality of time periods;
   wherein the hand shake intensity per unit of time of the second time period is greater than that of the rest of the plurality of time periods;
   obtaining a plurality of images having different exposure times during the total exposure time based on the photographing condition and the hand shake information, wherein the plurality of images includes a first image the first image having an exposure time that is less than that of the second image, wherein the obtaining comprises:
      obtaining the first image in the first time period according to the photographing condition,
      obtaining the second image in the second time period according to the photographing condition; and
   generating a corrected image in which the hand shake is corrected based on image information of the first image and image information of the second image.

7. A digital photographing apparatus comprising:
   a photographing condition detector that detects photographing conditions;
   a hand shake information derive unit that, based on the detected photographing condition,
      extracts hand shake information of a first time period of a plurality of time periods of a total exposure time;
      extracts hand shake information of a second time period of the plurality of time periods;

wherein the hand shake intensity per unit of time of the first time period is less than that of the rest of the plurality of time periods;

wherein the hand shake intensity per unit of time of the second time period is greater than that of the rest of the plurality of time periods;

a photographing controller that controls the digital photographing apparatus to obtain a plurality of images having different exposure times during the total exposure time based on the photographing condition and the hand shake information, wherein the photographing controller controls the digital photography apparatus to obtain a first image in the first time period and second image in the second time period according to the photographing condition, the first image having an exposure time that is less than that of the second image; and an image corrector that generates a corrected image in which the hand shake is corrected, by using image information of the first image and image information of the second image.

8. The digital photographing apparatus of claim 7, wherein the photographing condition comprises at least one of grip posture, user information, photographing mode, and type of the digital photographing apparatus.

9. The digital photographing apparatus of claim 7, further comprising a hand shake information database (DB) that stores hand shake information corresponding to the photographing condition.

10. The digital photographing apparatus of claim 7, wherein the photographing controller controls a shutter speed to obtain the plurality of images having different exposure times from each other.

11. The digital photographing apparatus of claim 7, wherein the image corrector comprises:

an image information extractor that extracts the image information of the first image and the image information of the second image, wherein the image information of the first image is boundary information, and the image information of the second image is noise information.

12. A method of controlling a digital photographing apparatus, the method comprising:

detecting a photographing condition;

based on the detected photographing condition,
extracting hand shake information of a first time period of a plurality of time periods of a total exposure time;
extracting hand shake information of a second time period of the plurality of time periods;

wherein the hand shake intensity per unit of time of the first time period is greater than that of the rest of the plurality of time periods;

wherein the hand shake intensity per unit of time of the second time period is less than that of the rest of the plurality of time periods;

obtaining a plurality of images having different exposure times during the total exposure time based on the photographing condition and the hand shake information, wherein the plurality of images includes a first image and a second image, the first image having an exposure time that is less than that of the second image, wherein the obtaining comprises:

obtaining the first image in the first time period according to the photographing condition, obtaining the second image in the second time period according to the photographing condition; and generating a corrected image in which the hand shake is corrected based on image information of the first image and image information of the second image.

13. The method of claim 12, further comprising:

extracting the image information of the first image information and the image information of the second image, wherein the image information of the first image is boundary information, and the image information of the second image is noise information.

14. The method of claim 12, wherein the photographing condition comprises at least one of grip posture, user information, photographing mode, and type of the digital photographing apparatus.

* * * * *